United States Patent [19]

Schober

[11] 4,018,852
[45] Apr. 19, 1977

[54] COMPOSITION WITH TRIALLYL COMPOUNDS AND PROCESS FOR AVOIDING SCORCHING OF ETHYLENE POLYMER COMPOSITION

[75] Inventor: Donald Lincoln Schober, Belle Mead, N.J.

[73] Assignee: Union Carbide Corporation, New York, N.Y.

[22] Filed: Jan. 29, 1976

[21] Appl. No.: 653,378

Related U.S. Application Data

[63] Continuation-in-part of Ser. No. 527,854, Nov. 27, 1974, abandoned.

[52] U.S. Cl. .................. 260/878 R; 260/47 UA; 427/117; 526/57
[51] Int. Cl.² .................. C08F 8/06; C08J 3/24
[58] Field of Search .................. 260/878 R, 47 UA; 526/57; 427/117

[56] References Cited

UNITED STATES PATENTS

| 3,531,455 | 9/1970 | Straub | 260/94.9 GA |
| 3,578,647 | 5/1971 | Gregorian et al. | 260/86.7 |
| 3,661,877 | 5/1972 | Bluestein et al. | 260/86.7 |

*Primary Examiner*—William F. Hamrock
*Attorney, Agent, or Firm*—James J. O'Connell

[57] ABSTRACT

Vulcanizable ethylene polymer based compositions which are susceptible to scorching when processed at elevated temperatures, prior to vulcanization, in the presence of certain organic peroxide compounds, are protected against such scorching by the incorporation therein of certain organic hydroperoxide compounds and organic compounds containing at least three allyl groups.

65 Claims, 2 Drawing Figures

TYPICAL MONSANTO RHEOMETER CURVE

COMPOSITION WITH TRIALLYL COMPOUNDS AND PROCESS FOR AVOIDING SCORCHING OF ETHYLENE POLYMER COMPOSITION

CROSS REFERENCES TO RELATED PATENT APPLICATIONS

This patent application is a continuation-in-part of patent application Ser. No. 527,854 filed Nov. 27, 1974, now abandoned.

BACKGROUND OF THE INVENTION

1. Field of the Invention

The invention relates to the prevention of scorching, prior to vulcanization, of peroxide curable ethylene polymer based compositions.

2. Description of the Prior Art

Insulation compositions which are employed on electrical wire and cable are, in many cases, prepared from compositions which are based on vulcanizable, or cross-linkable, ethylene polymers. These ethylene polymer based compositions may be vulcanized, or cured, or crosslinked, with various organic peroxide compounds, as disclosed for example in U.S. Pat. Nos. 2,826,570; 2,888,424; 2,916,481; 3,079,370 and 3,296,189.

In the organic peroxide compounds which have been used to date for commercial purposes in these vulcanizable ethylene polymer based compositions, each oxygen atom in the peroxide group, i.e., —O—O—, of such compounds is directly attached to a carbon atom of an organic radical. The commercially useful compositions do not employ hydroperoxide compounds therein as curing agents because they have relatively high decomposition temperatures, and the free radicals provided by the decomposed hydroperoxides are not effective for cross-linking ethylene polymers.

In order to process the organic peroxide containing compositions so as to adapt them to be placed, as insulation, on the electrical conductor components of the wire and cable it is usually necessary to admix the components of the compositions at high temperatures, and to extrude them, again at high temperatures, onto the electrical conductor. These processing activities occur prior to the intended vulcanization of the peroxide containing compositions, which is usually accomplished after such compositions are extruded onto the electrical conductor.

It has been found, however, that when certain of the organic peroxide compounds, such as dicumyl peroxide, are used in combination with certain types of ethylene polymers or in certain types of ethylene polymer based compositions, that the entire curable composition is susceptible to scorching during the high temperature processing thereof prior to the vulcanization of the composition on the electrical conductor. Scorching is, in effect, the premature vulcanization of the insulation composition. This premature vulcanization usually occurs, when it occurs, in the barrel or die head of the extruder in which the insulation composition is being processed, at elevated temperatures, prior to its being extruded onto an electrical conductor, and prior to its intended vulcanization. When an insulation composition is scorched in the extruder, the extruded composition will have imperfections in the form of discontinuity and roughness in the surface of the extrudate; and lumps or surface ripples caused by gel particles in the body of the extrudate. In addition, excessive scorching may cause enough of a pressure build-up in the extrusion device to require a cessation of the extrusion operation entirely.

The tendency of a composition to experience scorch is a relative matter, since any vulcanizable ethylene polymer based composition can be made to scorch if processed under conditions designed to produce such result. Under a given set of conditions some compositions are more prone to scorching than are others. Compositions which have been found to be more susceptible to scorching under a given set of conditions are those in which the ethylene polymer has a relatively low melt index and/or a relatively narrow molecular weight distribution.

The tendency of a composition to scorch under commercial operating conditions may be measured by means of the Monsanto Rheometer Test Procedure. The Monsanto Rheometer Test Procedure is described in ASTM-D-2084-71T.

Prior to the work of the present inventor as disclosed in this patent application, and three others filed on even date herewith, scorch prevention has been accomplished by the use of additives such as nitrites as disclosed in U.S. Pat. No. 3,202,648; the specific antioxidants and vulcanization accelerators disclosed in U.S. Pat. No. 3,335,124; and the chain transfer agents disclosed in U.S. Pat. No. 3,578,647. A mixture of two specific peroxides has also been used to provide a rate of cure that is intermediate the rate of cure of either of such peroxides, as disclosed in U.S. Pat. No. 3,661,877.

SUMMARY OF THE INVENTION

It has now been found that vulcanizable ethylene polymer based compositions which employ certain classes of organic peroxides therein as vulcanizing agents, and which compositions are susceptible to scorching under a given set of conditions, can be protected against scorching under such conditions by incorporating in such compositions certain classes of organic hydroperoxides and organic compounds containing at least three allyl groups.

An object of the present invention is to provide scorch resistant, vulcanizable, ethylene polymer based compositions.

Another object of the present invention is to provide a process for protecting against scorching vulcanizable ethylene polymer based compositions which employ therein certain classes of organic peroxides as vulcanizing agents and which are susceptible to scorching.

A further object of the present invention is to provide scorch resistant insulation for electrical wire and cable.

A further object of the present invention is to provide a process whereby vulcanizable ethylene polymer based compositions which employ therein certain classes of organic peroxide compounds as vulcanizing agents and which compositions are susceptible to scorching, may be processed in mixing and extruding devices, prior to the vulcanization thereof, at fast throughput rates and at relatively high processing temperatures without experiencing scorching.

These and other objects of the present invention are achieved by employing certain classes of organic hydroperoxides in combination with organic compounds containing at least three allyl groups as scorch preventing agents in the compositions of the present inventions.

THE DRAWINGS

FIGS. 1 and 2 of the drawings show, graphically, Monsanto Rheometer Test curves which were used to illustrate the derivation of an efficiency factor as described below.

DESCRIPTION OF THE PREFERRED EMBODIMENT

The Scorch Resistant Composition

Figure 1:
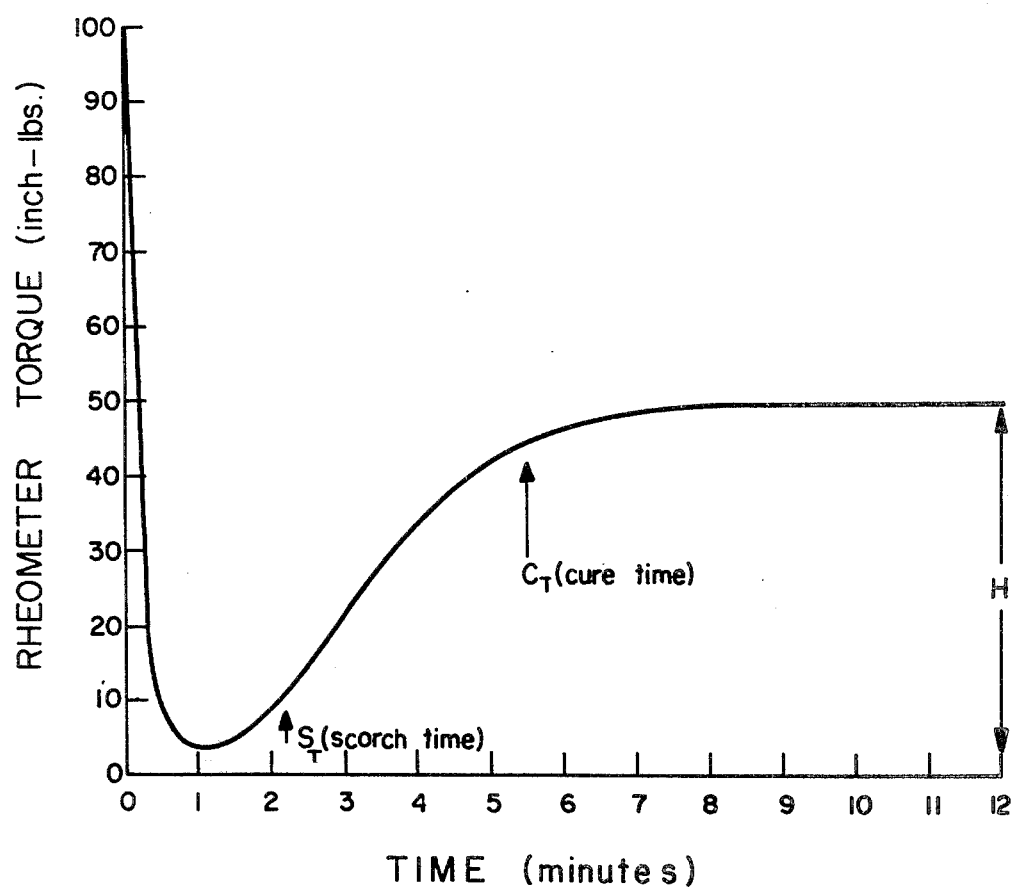

The scorch resistant compositions of the present invention comprise, in weight ratio, 100 parts by weight of ethylene polymer, about 0.1 to 5.0, and preferably 0.2 to 2.0, parts by weight of at least one first peroxide compound which has carbon atoms directly bonded to each oxygen atom of each peroxide group (—O—O—) therein, and which compounds, as a class, are described below, about 0.1 to 2.0, and preferably about 0.05 to 1.0, parts by weight of at least one second peroxide compound which is a hydroperoxide of the class described below, and about 0.1 to 5.0, and preferably about 0.2 to 2.0 parts by weight of one or more organic compounds containing at least three allyl groups.

About one part by weight of the second peroxide is used per 2 to 10 parts by weight of the first peroxide.

About one part by weight of the triallyl compound is used per 1 to 5 parts by weight of the first peroxide.

Ethylene Polymer

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, $>C = C>$. These other interpolymerizable compounds may be hydrocarbon compounds such as, butene-1, pentene-1, isoprene, butadiene, bicycloheptene, bicycloheptadiene, and styrene, as well as vinyl compounds such as vinyl acetate and ethyl acrylate.

These copolymers could thus include those containing >0 to 70 weight percent of propylene and 30 to <100 weight percent of ethylene; and >0 to <50 weight percent butene-1 or vinyl acetate and 50 to <100 weight percent of ethylene; and >0 to <30 weight percent of propylene, >0 to 20 weight percent of butene-1 and 50 to <100 weight percent of ethylene.

The ethylene polymers may be used individually, or in combinations thereof. The ethylene polymers have a density (ASTM 1505 test procedure with conditioning as in ASTM D-1248-72) of about 0.86 to 0.96 and a melt index (ASTM D-1238 at 44 psi test pressure) of about 0.1 to 20 decigrams per minute.

FIRST PEROXIDE COMPOUND

The first peroxide compound which is employed in the compositions of the present invention is employed therein as the primary vulcanizing agent for the ethylene polymers. These compounds are organic peroxides which have a decomposition half-life of about 0.5 to 4.5 minutes, and preferably of about 1 to 2 minutes, at 160°–200° C, and preferably at 180°–190° C, and which have the structure

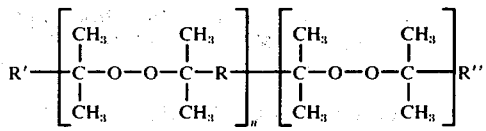

wherein

R is a $C_2$ to $C_{12}$ saturated or unsaturated divalent hydrocarbon radical,

R' and R'' are the same or different $C_1$ to $C_{12}$ saturated or unsaturated monovalent hydrocarbon radicals, and n is a whole number of 0 or 1.

The R radicals would include aromatic hydrocarbon radicals such as phenylene, and saturated and unsaturated linear $C_2$ to $C_4$ hydrocarbon radicals such as ethynylene (—C ≡ C—) and ethylene (—CH$_2$—CH$_2$—). The R, R' and R'' radicals may be unsubstituted, preferably, or they may be substituted with inert inorganic radicals such as Cl.

The preferred of the first peroxide compounds are those wherein R' = R''.

When n is 0 the first peroxide compounds would include (with their decomposition half-life at 180° C)

di -α-cumyl peroxide. (0.8 to 1.2 minutes), di -α, p-cyml peroxide (0.6 to 1.0 minute) and di-t-butyl peroxide (3.0 to 3.1 minutes).

When n is 1 the first peroxide compounds would include (with their decomposition half-life at 180° C)

α,α'-bis (t-butyl peroxy di-isopropyl)benzene (1.0 to 1.3 minutes), 2,5-dimethyl-2,5-di(t-butyl peroxy) hexane (1.2 to 1.4 minutes) and 2,5-dimethyl-2,5-di(t-butyl peroxy) hexyne-3, (4.2 to 4.4 minutes).

The first peroxides can be used individually or in combination with one another.

SECOND PEROXIDE COMPOUND

The second peroxide compound which is employed in the compositions of the present invention is employed therein primarily to prevent scorching of the composition. It does not participate, to any significant extent, the vulcanization of the ethylene polymer in the composition. Its mode of activity in this regard is not entirely understood but it is believed to result from donation of its active hydrogen atom to the free radical of the first peroxide compound. This rate of donation, under a given set of processing conditions, is faster than the rate of abstraction of hydrogen from the ethylene polymer, so that the vulcanizing utility of the first peroxide compound is retarded in the presence of the second peroxide compound.

These second peroxide compounds are organic hydroperoxides which have a decomposition half-life of about 0.5 to 3 hours, and preferably of about 1 to 2 hours, at ≥ 160° to 200° C and preferably at 180°–190° C, and they have the structure

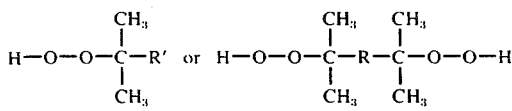

wherein R and R' have the same meaning as disclosed above with respect to the first compounds.

Examples of the second peroxide compounds which may be used in the compositions of the present invention, in accordance with the disclosure made above, would include (with their decomposition half-life at 180° C.)

Cumene hydroperoxide, (1.3 to 1.5 hours)
t-butyl hydroperoxide, (3 hours)
2,5-dimethyl-2,5-di-hydroperoxy hexane (1.0 to 1.1 hours)

The specific second peroxide compound(s) employed in a composition are preferably those which have a decomposition rate which is at least about 20 to 100, and is most preferably about 60 to 80, times slower than the decomposition rate of the first peroxide compound(s) employed in such composition, at the intended vulcanization temperatures.

The second peroxides can be used individually or in combination with each other.

ALLYL COMPOUNDS

The organic compounds which contain at least three allyl groups which can be used in the present invention include triallyl cyanurate
triallyl phosphate
triallyl phosphite
triallyl ortho formate, and
tetra-allyloxy ethane.

About 0.5 to 3.0, and preferably about 1 to 2 parts by weight of the allyl compound is used per 1 to 5 parts by weight of the first peroxide.

The allyl compounds may be used individually or in combination with each other.

Adjuvants

In addition to the ethylene polymer, the two peroxide compounds, and the allyl compounds, the compositions of the present invention also advantageously include about 0.01 to 3.0 and, preferably 0.05 to 1.0, parts by weight of one or more suitable high temperature antioxidants for the ethylene polymers, per 100 parts by weight of ethylene polymer in such compositions.

These antioxidants are preferably sterically hindered phenols. Such compounds would include 1,3,5-trimethyl-2,4,6-tris(3,5-ditertiary butyl-4-hydroxy benzyl)benzene; 1,3,5-tris(3,5-ditertiary butyl-4-hydroxy benzyl)-5-triazine-2,4,6-(1H, 3H, 5H) trione; tetrakis- [methylene-3-(3', 5-di-t-butyl-4'-hydroxy phenyl)-propionate]methane; and di(2-methyl-4-hydroxy-5-t-butyl phenyl)sulfide. Polymerized 2,2,4-trimethyl dihydroquinoline may also be used.

Other adjuvants which may be employed in the compositions of the present invention would include adjuvants commonly employed in vulcanizable ethylene polymer based compositions including fillers, such as carbon black, clay, talc and calcium carbonate; blowing agents; nucleating agents for blown systems; lubricants; UV stabilizers; dyes and colorants; voltage stabilizers; metal deactivators and coupling agents.

These adjuvants would be used in amounts designed to provide the intended effect in the resulting composition.

The compositions of the present invention may also be extended, or filled, with polymers other than the ethylene polymer which are compatible, i.e., can be physically blended or alloyed, with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene.

The total amount of adjuvants used will range from 0 to about 60 percent based on the total weight of the composition.

Processing of the Compositions

All of the components of the compositions of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers, or dissolved in mutual or compatible solvents.

When all the solid components of the composition are available in the form of a powder, or as small particles, the compositions are most conveniently prepared by first making a blend of the components, say in a Banbury mixer or a continuous extruder, and then masticating this blend on a heated mill, for instance a two-roll mill, and the milling continued until an intimate mixture of the components is obtained. Alternatively, a master batch containing the ethylene polymer(s) and the antioxidants(s) and, if desired, some or all of the other components, may be added to the mass of polymer. Where the ethylene polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature which is within the range 80° to 150° C. and which is below the decomposition temperatures of the first peroxide compound(s). The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus at about 120° to 160° C.

After being extruded onto a wire or cable, or other substrate, the compositions of the present invention are vulcanized at elevated temperatures of about ≥ 180° C. and preferably at ≥ 215°–230° C. using conventional vulcanizing procedures.

Derivation of Curing System Efficiency Factor

In the Monsanto Rheometer Test Procedure a sample of the vulcanizable composition is measured in a rheometer before the composition is subject to high temperature mixing or extrusion conditions. The test results are plotted as functions of inch-pounds of torque versus time. The compositions which are less susceptible to scorching are those that experience, after the minimum torque value is achieved, a delay in the rise of the torque values followed by a fast rise in the torque values to the level required for the intended end use of the composition being evaluated.

The Monsanto Rheometer Test Procedure is, in effect, a means for comparatively evaluating, graphically, the susceptibility of different vulcanizable compositions to scorch. In this way the use of different curing agents, or curing agent compositions, in such vulcanizable compositions, can also be graphically compared.

For the purposes of the present invention, a procedure has now been devised whereby, using the graphical results of Monsanto Rheometer Test procedures, the efficiency of different curable compositions, relative to the susceptibility of such compositions to scorching, can also be numerically compared. By using this new evaluation procedure, a separate and distinct numerical-efficiency factor (E) can be assigned to each curable composition. To make these efficiency factors more meaningful, for comparison purposes, they should be based on rheometer curves which are all obtained when the curable compositions being compared are evaluated under the same test conditions. In all the experiments reported herein the test samples were evaluated in a Monsanto Rheometer at a cure temperature of 360° F., using a rheometer oscillation of 110 CPM and an arc of ± 5°.

There is also provided here below, the derivation of a numerical efficiency factor (E) for vulcanizable compositions. The derivation employs typical rheometer curves that were arbitrarily drawn, and which are not based on actual experiments. Such curves are shown in FIGS. 1 and 2 of the drawings.

Figure 2:
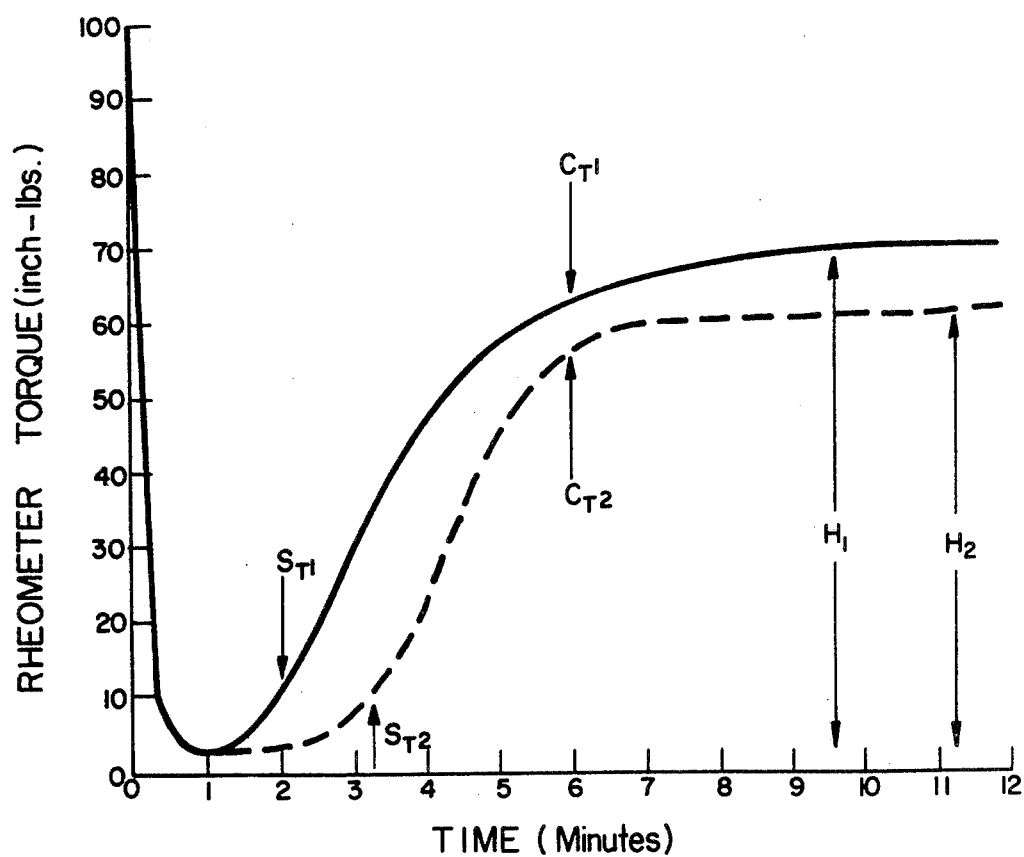

A typical Monsanto Rheometer curve, as shown graphically in FIG. 1, contains several parameters which are used in the derivation of the efficiency factor (E). The optimum cure level (highest cross-link density) is designated as H. H is measured in terms of inch-pounds of torque on the rheometer test equipment. A higher value for H corresponds to a higher cross-link density.

The time, in minutes, required to reach 90% of the maximum cure (H) is designated as $C_T$. Thus, in FIG. 1, H is 50 inch-pounds and $C_T$ is 5.5 minutes, which is the time required to reach a level of 45 (or 90% of 50) inch-pounds of torque during the test procedure.

The scorch time, $S_T$, is defined as the point in time, in minutes, at which the curve reaches a rheometer level of 10 inch-pounds of torque on the upswing of the curve. In FIG. 1, $S_T$ is about 2.1 minutes.

In general, one is interested in getting to the maximum cure (H) as soon as possible. In other words, a short $C_T$ is desirable. At the same time, one would like $S_T$ to be as long as possible since a longer $S_T$ means the vulcanizable composition being evaluated can be processed at a higher speed or at a higher temperature. That is, it would be less scorchy. Thus it is important to discuss the time intervals between $C_T$ and $S_T$, or $C_T - S_T$ since $C_T$ is, arbitrarily, always longer than $S_T$.

Then, too, it is of interest to compare $S_T$ with $C_T - S_T$ since the best vulcanizable system would be one whose $S_T$ is relatively long, and whose difference between $C_T$ and $S_T$, ($C_T - S_T$), would be relatively short. Thus, the ratio $S_T/C_T - S_T$ is of importance. The larger is this ratio, the less susceptible is the vulcanizable composition to scorching.

Finally, the times ($C_T$ and $S_T$) are related to the maximum cure point H. Thus, if one can maintain the same $S_T$, and yet reach a higher H, one can thereby provide a vulcanizable composition that is less susceptible to scorch. When vulcanizable compositions are cured by peroxide curing agent systems, particularly those using individual peroxides such as dicumyl peroxide, as you increase the value of H, by simply adding more of the peroxide curing agent, you decrease $S_T$.

The efficiency of a particular curing agent system, therefore, when used with a given vulcanizable composition, and cured at a given temperature, can be determined by multiplying H by $S_T/C_T-S_T$ or, as shown in Equation I;

$$E = \frac{H \times S_T}{C_T - S_T} \quad (1)$$

The numerical efficiency (E) of the arbitrary curing agent system shown graphically in FIG. 1 therefore, would, be $$E = \frac{H \times S_T}{C_T - S_T} = \frac{(50)(2.1)}{5.5 - 2.1} = 30.9$$

To further illustrate the utility of this method, for the purposes of comparatively evaluating different vulcanizable compositions, reference is made to FIG. 2 of the drawings in which there is graphically presented typical Monsanto Rheometer curves 1 and 2 that were also arbitrarily drawn, and which are not based on actual experiments.

It should be noted from a review of FIG. 2 that the cure times $C_{T-1}$ for composition 1 and $C_{T-2}$ for composition 2, are the same for both compositions and each curve reaches a relatively high torque level with the value $H_1$ (for composition 1) which is 70, being relatively close to the value of $H_2$ (for composition 2) which is 62. $S_{T-2}$ (for composition 2), however, is more than a minute longer than $S_{T-1}$ (for composition 1), 3.2 vs 2.0 minutes. Thus, it is quite obvious from a review of these two curves that curve 2 represents the better cure system. If one maintains the same $C_T$, and reaches almost the same maximum cross-link density (H), then increasing $S_T$ must lead to a better curing system, in accordance with the above definition of E.

A calculation of the relative numerical efficiencies of the curable compositions shown graphically in FIG. 2 is shown below:

Efficiency ($E_1$) of composition 1, based on curve 1:

$$E_1 = \frac{H_1 \times S_{T1}}{C_{T1} - S_{T1}} = \frac{(70)(2)}{(6-2)} = \frac{140}{4} = 35.0$$

Efficiency ($E_2$) of composition 2, based on curve 2:

$$E_2 = \frac{H_2 \times S_{T2}}{C_{T2} - S_{T2}} = \frac{(62)(3.2)}{(6-3.2)} = \frac{198.4}{2.8} = 70.8$$

Thus, this efficiency factor, E, is a useful parameter and it can be shown that in fact a higher value for E represents a better system, as defined above, and represents improved utility for such better system. The use of this efficiency factor, E, can also apply to comparisons of Rheometer test curves where the maximum cure (H) shown in each curve is vastly different, since the calculation of E is, in effect, a normalization procedure. The compositions of the present invention have an efficiency factor (E), as determined above, which is at least about 3, and is preferably more than 10 to 15, units of such efficiency factor above the efficiency factor of such compositions in the absence of the allyl compounds.

The following examples are merely illustrative of the present invention and are not intended as a limitation upon the scope thereof.

General Admixing Procedure

The vulcanizable compositions used in Examples 1–36 were all prepared by the following procedure:

100 Parts by weight of the ethylene polymer were fluxed in a Banbury mixer at approximately 120° C. The additives, i.e., anti-oxidant, and the first and second peroxides and the allyl compounds, and, where used, other adjuvants, were then added to the fluxed mixture. The resulting composition was then blended for 2–3 minutes and then transferred to a 2-roll mill for sheeting. The hot rolled sheet was then chopped on a hot granulator to yield a chipped product.

The chips were then compression molded into plaques for use in Monsanto Rheometer test procedures. All of the rheometer data which was then obtained on the samples, unless otherwise stipulated, was obtained at 360° F. (182.2° C.).

Examples 1–5

Five vulcanizable compositions were prepared as in the General Admixing Procedure utilizing dicumyl peroxide (DCP) as a first peroxide compound with a low density (density of < 0.94) ethylene homopolymer-Homopolymer I-[having a density of 0.919, a melt index of 1.6–2.2 (1P, 190° C.], cumene hydroperoxide (Cumene H) as a second peroxide compound and triallyl cyanurate (TAC). The compositions are shown, in parts by weight in Table I.

TABLE I

| Examples | 1 | 2 | 3 | 4 | 5 |
|---|---|---|---|---|---|
| Homopolymer I | 100.0 | 100.0 | 100.0 | 100.0 | 100.0 |
| DCP | 2.0 | 2.0 | 1.0 | 2.0 | 2.0 |
| TAC | — | 0.5 | 1.0 | 0.5 | — |
| Cumene H | — | — | — | 0.5 | 0.5 |

When tested for Efficiency Factors, as disclosed above, the compositions of Examples 1–5 had Efficiency Factors, based on the values for H, $C_T$ and $S_T$, as disclosed below in Table II.

TABLE II

| Examples | 1 | 2 | 3 | 4 | 5 |
|---|---|---|---|---|---|
| H | 44.0 | 64.0 | 44.0 | 54.0 | 24.0 |
| $C_T$ | 5.5 | 5.0 | 5.6 | 4.6 | 5.6 |
| $S_T$ | 1.75 | 1.5 | 2.1 | 1.8 | 2.8 |
| E | 20.5 | 27.4 | 26.4 | 34.7 | 24.1 |

These results indicate that although the use of TAC or Cumene H alone (Examples 2, 3 & 5) will increase the E value of the composition of Example 1, the use of TAC plus Cumene H provides a much higher E value (Example 4) than would be expected based on the results of Examples 2, 3 and 5.

Examples 6–9

Four vulcanizable compositions were prepared as in Examples 1–5 using ethylene homopolymer I, TAC, Cumene H, and 2,5-dimethyl-2,5-di-(tertiary butyl peroxy)hexane (2,5-DTBPH) as a first peroxide compound. The compositions are shown, in parts by weight, in Table III.

TABLE III

| Examples | 6 | 7 | 8 | 9 |
|---|---|---|---|---|
| Homopolymer I | 100.0 | 100.0 | 100.0 | 100.0 |
| 2,5-DTBPH | 2.0 | 1.0 | 2.0 | 1.0 |
| TAC | — | 1.0 | — | 1.0 |
| Cumene H | — | — | 0.5 | 0.5 |

When tested for Efficiency Factors, as disclosed above, the Compositions of Examples 6–9 had Efficiency Factors, based on the values of H, $C_T$ and $S_T$, as disclosed below in Table IV

TABLE IV

| Examples | 6 | 7 | 8 | 9 |
|---|---|---|---|---|
| H | 50.0 | 52.0 | 32.0 | 45.0 |
| $C_T$ | 10.2 | 9.0 | 11.0 | 10.7 |
| $S_T$ | 2.4 | 2.8 | 3.7 | 4.3 |
| E | 15.8 | 23.5 | 16.2 | 30.3 |

These results indicate that although the use of TAC or Cumene H alone (Examples 7–8) will increase the E value of the composition of Example 6 somewhat, the use of TAC plus Cumene H provides a much higher E value (Example 9) than would be expected based on the results of Examples 7 and 8.

Examples 10–13

Four vulcanizable compositions were prepared as in Examples 1–5 utilizing homopolymer I, TAC, Cumene H, and α,α-bis (tertiary butyl peroxy) di-isopropyl benzene (TBPDIP) as a first peroxide compound. The compositions are shown, in parts by weight, in Table V.

TABLE V

| Examples | 10 | 11 | 12 | 13 |
|---|---|---|---|---|
| Homopolymer I | 100.0 | 100.0 | 100.0 | 100.0 |
| TBPDIB | 2.0 | 2.0 | 1.0 | 1.0 |
| TAC | — | — | 1.0 | 1.0 |
| Cumene H | — | 0.5 | — | 0.5 |

When tested for Efficiency Factors, as disclosed above, the Compositions of Examples 10–13 had Efficiency Factors, based on the values for H, $C_T$ and $S_T$, as disclosed below in Table VI.

TABLE VI

| Examples | 10 | 11 | 12 | 13 |
|---|---|---|---|---|
| H | 70.0 | 63.0 | 68.0 | 62.0 |
| $C_T$ | 8.7 | 8.4 | 7.3 | 7.2 |
| $S_T$ | 1.6 | 2.4 | 1.3 | 2.2 |

TABLE VI-continued

| Examples | 10 | 11 | 12 | 13 |
|---|---|---|---|---|
| E | 15.8 | 25.1 | 14.1 | 27.3 |

These results indicate that since the use of TAC alone (Examples 12) decreases the E value of the composition of Example 10, that the use of TAC plus Cumene H provides a higher E value (Example 13) than would be expected, notwithstanding the increased value of E that might be expected from using Cumene H (Example 11) above.

Examples 14–17

Four vulcanizable compositions were prepared as in Examples 1–5 utilizing DCP as the first peroxide, TAC, tertiary butyl hydroperoxide (TBH) as the second peroxide, and an ethylene-ethyl acrylate copolymer (copolymer I) which contained 15% by weight of ethyl acrylate and had a melt index of 1.6–2.2 (1P, 190° C). The compositions are shown, in parts by weight, in Table VII.

TABLE VII

| Examples | 14 | 15 | 16 | 17 |
|---|---|---|---|---|
| Copolymer I | 100.0 | 100.0 | 100.0 | 100.0 |
| DCP | 2.0 | 2.0 | 1.0 | 1.0 |
| TAC | — | — | 1.0 | 1.0 |
| TBH | — | 0.2 | — | 0.2 |

When tested for Efficiency Factors, as disclosed above, the compositions of Examples 14–17 had Efficiency Factors, based on the values of H, $C_T$ and $S_T$, as disclosed below the Table VIII

TABLE VIII

| Examples | 14 | 15 | 16 | 17 |
|---|---|---|---|---|
| H | 67.0 | 44.0 | 76.0 | 72.0 |
| $C_T$ | 5.3 | 5.6 | 4.9 | 5.5 |
| $S_T$ | 1.1 | 2.1 | 1.13 | 1.9 |
| E | 16.9 | 25.8 | 22.9 | 38.0 |

These results indicate that although the use of TAC or TBH alone (Examples 15–16) will increase the E value of the composition of Example 14, the use of TAC plus TBH provides a much higher E value (Example 17) than would be expected based on the results of Examples 15–16.

Examples 18–21

Four vulcanizable compositions were prepared as in Examples 1–5 utilizing DCP as the first peroxide, TAC, TBH as the second peroxide, and an ethylene-vinyl acetate copolymer (Copolymer II) which contained 10% by weight of vinyl acetate and had a melt index of 2.0 (1P, 190° C). The compositions are shown, in parts by weight, in Table IX.

TABLE IX

| Examples | 18 | 19 | 20 | 21 |
|---|---|---|---|---|
| Copolymer II | 100.0 | 100.0 | 100.0 | 100.0 |
| DCP | 2.0 | 2.0 | 1.0 | 1.0 |
| TAC | — | — | 1.0 | 1.0 |
| TBH | — | 0.2 | — | 0.2 |

When tested for Efficiency Factors, as disclosed above, the compositions of Examples 18–21 had Efficiency Factors, based on the values of H, $C_T$ and $S_T$, as disclosed below in Table X.

TABLE X

| Examples | 18 | 19 | 20 | 21 |
|---|---|---|---|---|
| H | 73.0 | 62.0 | 74.0 | 79.5 |
| $C_T$ | 4.8 | 5.2 | 3.9 | 4.1 |
| $S_T$ | 1.05 | 1.85 | 1.05 | 1.7 |
| E | 20.4 | 34.2 | 27.3 | 55.2 |

These results indicate that although the use of TAC or TBH alone (Examples 19–20) will increase the E value of the composition of Example 18, the use of TAC plus TBH provides a much higher E value (Example 21) than would be expected based on the results of Examples 19–20.

Examples 22–25

Four vulcanizable compositions were prepared as in Examples 1–5 utilizing α, α-bis (tertiary-butyl peroxy diisopropyl)benzene(TBPDIP) as the first peroxide, TAC, TBH and three ethylene polymers. The three polymers were a high density ⩾ 0.94) ethylene homopolymer (Homopolymer II) having a density of 0.96 and a melt index of 8.0 (1P, 190° C); an ethylene-ethyl acrylate copolymer (Copolymer III) having an ethyl acrylate content of 23 weight percent, a density of 0.92 and a melt index of 20 (1P, 190° C); and an ethylene-ethyl acrylate copolymer (Copolymer IV) having an ethyl acrylate content of 18 percent by weight and a melt index of 4.5 (1P, 190° C). Homopolymer II and Copolymer III were added to the composition as is. Copolymer IV was added to the composition in the form of Formulation I which contained 68 percent by weight of Copolymer IV and 32% by weight of carbon black. The compositions are shown, in parts by weight, in Table XI.

TABLE XI

| Example | 22 | 23 | 24 | 25 |
|---|---|---|---|---|
| Homopolymer II | 10.0 | 10.0 | 10.0 | 10.0 |
| Copolymer III | 45.0 | 45.0 | 45.0 | 45.0 |
| Formulation I | 45.0 | 45.0 | 45.0 | 45.0 |
| TBPDIP | 1.75 | 0.8 | 0.7 | 0.7 |
| TAC | — | 0.8 | 0.7 | 0.7 |
| TBH | — | — | — | 0.2 |

When tested for Efficiency Factors, as disclosed above, the compositions of Examples 22–25 had Efficiency Factors, based on the values for H, $C_T$ and $S_T$, as disclosed below in Table XII.

TABLE XII

| Examples | 22 | 23 | 24 | 25 |
|---|---|---|---|---|
| H | 100.0 | 77.0 | 63.0 | 71.0 |
| $C_T$ | 9.0 | 6.9 | 7.2 | 7.7 |
| $S_T$ | 1.7 | 1.6 | 2.0 | 2.5 |
| E | 23.3 | 23.3 | 24.2 | 34.2 |

These results indicate that although the use of TAC or TBH alone (Examples 23–24) provides little or no increase in the E value of the composition of Example 22, the use of TAC plus TBH provides a substantial increase in the E value (Example 25) of the composition of Example 22.

Examples 26–31

Six carbon black filled, vulcanizable compositions were prepared as in Examples 1–5 utilizing dicumyl peroxide (DCP) as the first peroxide, TBH, various unsaturated allyl or acrylate compounds and Copolymer II. The compositions contained, as an antioxidant, polymerized 2,2,4-trimethyl-di-hydroquinoline. The compositions are shown, in parts by weight, in Table XIII.

TABLE XIII

| Examples | 26 | 27 | 28 | 29 | 30 | 31 |
| --- | --- | --- | --- | --- | --- | --- |
| Copolymer II | 73.8 | 73.8 | 73.8 | 73.8 | 73.8 | 73.8 |
| Carbon black | 25.8 | 25.8 | 25.8 | 25.8 | 25.8 | 25.8 |
| Antioxidant | 0.4 | 0.4 | 0.4 | 0.4 | 0.4 | 0.4 |
| DCP | 1.6 | 0.8 | 0.8 | 0.8 | 0.8 | 0.8 |
| TBH | — | — | 0.2 | 0.2 | 0.2 | 0.2 |
| TAC | — | 0.8 | 0.8 | — | — | — |
| TAP | — | — | — | 0.7 | — | — |
| TMPTM | — | — | — | — | 1.09 | — |
| TMPTA | — | — | — | — | — | 0.96 |

TAP = triallyl phosphate
TMPTM = trimethylol propane trimethacrylate
TMPTA = trimethylol propane triacrylate When tested for Efficiency Factors, as disclosed above, the composition of Examples 26–31 had Efficiency Factors, based on the values of H, $C_T$ and $S_T$, as disclosed below in Table XIV.

TABLE XIV

| Examples | 26 | 27 | 28 | 29 | 30 | 31 |
| --- | --- | --- | --- | --- | --- | --- |
| H | 83.0 | 80.0 | 87.0 | 74.0 | 48.0 | 40.0 |
| $C_T$ | 4.2 | 3.5 | 4.0 | 4.0 | 4.7 | 4.1 |
| $S_T$ | 0.92 | 1.03 | 1.4 | 1.38 | 1.5 | 1.1 |
| E | 23.3 | 33.4 | 46.8 | 39.0 | 22.5 | 18.3 |

These test results indicate that although the use of TAC alone (Example 27) will improve the E value of the composition of Example 26, the use of TBH plus TAC, or TAP, will further substantially increase the E value of the composition of Example 26 over that obtained by the use of TAC alone. Further, the use of the trifunctional acrylate compounds TMPTM and TMPTA has a detrimental effect on the E value of the composition of Example 26, in the presence of TBH.

Examples 32–36

Five vulcanizable compositions were prepared as in Examples 1–5 utilizing DCP, as the first peroxide, TAC, TBH or cumene hydroperoxide (Cumene H) as the second peroxide, and Homopolymer I. The compositions contained, as an antioxidant, bis(2-methyl-4-hydroxy-5-t-butyl phenyl) sulfide. The compositions are shown, in parts by weight, in Table XV.

TABLE XV

| Examples | 32 | 33 | 34 | 35 | 36 |
| --- | --- | --- | --- | --- | --- |
| Homopolymer I | 100.0 | 100.0 | 100.0 | 100.0 | 100.0 |
| Antioxidant | 0.2 | 0.2 | 0.2 | 0.2 | 0.2 |
| DCP | 2.0 | 1.0 | 1.0 | 2.0 | 2.0 |
| TAC | — | 1.0 | 1.0 | 0.5 | 0.5 |
| TBH | — | — | 0.2 | — | — |
| Cumene H | — | — | — | — | 0.5 |

When tested for Efficiency Factors, as disclosed above, the compositions of Examples 32–36 had Efficiency Factors, based on the values of H, $C_T$ and $S_T$, as disclosed below in Table XVI.

TABLE XVI

| Examples | 32 | 33 | 34 | 35 | 36 |
| --- | --- | --- | --- | --- | --- |
| H | 42.7 | 48.5 | 46.0 | 63.3 | 49.5 |
| $C_T$ | 4.7 | 4.8 | 5.2 | 4.2 | 4.7 |
| $S_T$ | 1.7 | 1.9 | 2.46 | 1.42 | 2.15 |
| E | 24.2 | 31.8 | 41.3 | 32.3 | 41.7 |

These test results indicate that although the use of TAC alone (Examples 33 and 35) will improve the E value of the composition of Example 32, the use of TBH or Cumene H plus TAC (Examples 34 and 36) will further substantially increase the E value of the composition of Example 32 over that obtained by the use of TAC alone.

In all cases the tertiary butyl hydroperoxide was used in the form of a mixture of 90% tertiary butyl hydroperoxide and 10% tertiary butyl alcohol.

What is claimed is:
1. A scorch resistant vulcanizable composition comprising, in weight ratio,
   100 parts by weight of ethylene polymer,
   about 0.1 to 5.0 parts by weight of at least one first peroxide compound which has a decomposition half-life of about 0.5 to 4.5 minutes at 160° to 200° C. and has the structure

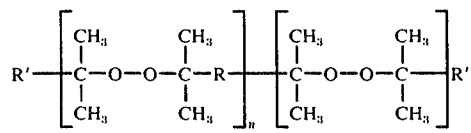

wherein
   R is a $C_2$ to $C_{12}$ divalent hydrocarbon radical,
   R' and R'' are the same or different $C_1$ to $C_{12}$ monovalent hydrocarbon radicals, and
   n is a whole number of 0 or 1,
about 0.1 to 2.0 parts by weight of at least one second peroxide which has a decomposition rate which is at least about 20 to 100 times slower than that of said first peroxide compound,
said second peroxide having the structure

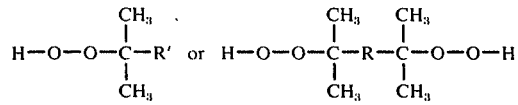

and about 0.1 to 5.0 parts by weight of at least one organic compound containing at least three allyl groups.

2. A composition as in claim 1 in which $n = 0$.
3. A composition as in claim 2 in which R' = R''.
4. A composition as in claim 3 in which R' and R'' are phenyl radicals.
5. A composition as in claim 3 in which R' and R'' are methyl radicals.
6. A composition as in claim 1 in which $n = 1$.
7. A composition as in claim 6 in which R' = R''.
8. A composition as in claim 7 in which R is an aromatic radical.
9. A composition as in claim 8 in which R is phenylene.

10. A composition as in claim 9 in which R' and R" are methyl radicals.

11. A composition as in claim 7 in which R is a $C_2$ to $C_4$ linear hydrocarbon radical.

12. A composition as in claim 11 in which R' and R" are methyl radicals.

13. A composition as in claim 1 in which the allyl compound contains three allyl groups.

14. A composition as in claim 13 in which said allyl compound comprises triallyl cyanurate.

15. A composition as in claim 13 in which said allyl compound comprises triallyl phosphate.

16. A composition as in claim 13 in which said allyl compound comprises triallyl phosphite.

17. A composition as in claim 13 in which said allyl compound comprises triallyl ortho formate.

18. A composition as in claim 1 in which the allyl compound contains four allyl groups.

19. A composition as in claim 18 in which the allyl compounds comprises tetra allyloxy ethane.

20. A composition as in claim 1 in which said ethylene polymer comprises ethylene homopolymer.

21. A composition as in claim 20 in which said ethylene homopolymer has a density of <0.94.

22. A composition as in claim 20 in which said ethylene homopolymer has a density of ≥ 0.94.

23. A composition as in claim 1 in which said ethylene polymer comprises ethylene copolymer.

24. A composition as in claim 23 in which said ethylene copolymer comprises ethylene-vinyl acetate copolymer.

25. A composition as in claim 23 in which said ethylene copolymer comprises ethylene-ethyl acrylate copolymer.

26. A process for preventing the scorching of a vulcanizable composition which is susceptible to scorching during the processing thereof at temperatures of about 120° to 160° C. prior to the intended vulcanization thereof.

said composition comprising, in weight ratio, 100 parts by weight of ethylene polymer, and about 0.1 to 5.0 parts by weight of at least one first peroxide compound which has a decomposition half-life of about 0.5 to 4.5 minutes at 160° to 200° C. and has the structure

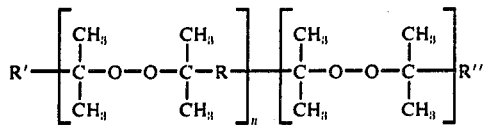

wherein
R is a $C_2$ to $C_{12}$ divalent hydrocarbon radical,
R' and R" are the same or different $C_1$ to $C_{12}$ monovalent hydrocarbon radicals, and
n is a whole number of 0 or 1, which comprises admixing into said composition, prior to said processing, about 0.1 to 5.0 parts by weight of at least one organic compound containing at least three allyl groups, and about 0.1 to 2.0 parts by weight of a second peroxide compound which has a decomposition rate which is at least about 20 to 100 times slower than that of said first peroxide compound, said second peroxide having the structure

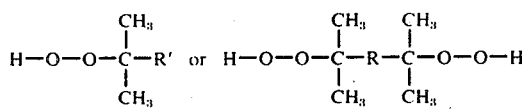

and then processing and vulcanizing said composition.

27. A vulcanized composition prepared by the process of claim 26.

28. Electric wire or cable insulated with a vulcanized composition prepared by the process of claim 26.

29. The composition of claim 1 in vulcanized form.

30. Electric wire cable insulated with the composition of claim 1 in vulcanized form.

31. A composition as in claim 1 in which said first peroxide comprises at least one compound selected from the group consisting of di-α-cumyl peroxide, di-α,p-cyml peroxide, di-t-butyl peroxide, α,α-bis (t-butyl peroxy di-isopropyl)benzene, 2,5-dimethyl-2,5-di(t-butyl peroxy)hexane and 2,5-dimethyl-2,5-di(t-butyl peroxy)hexyne-3.

32. A composition as in claim 31 in which said second peroxide comprises at least one compound selected from the group consisting of cumene hydroperoxide, t-butyl hydroperoxide and 2,5-dimethyl-2,5-dihydroperoxyhexane.

33. A composition as in claim 32 in which the allyl compound comprises at least one compound selected from the group consisting of triallyl cyanurate, triallyl phosphate, triallyl phosphite, triallyl ortho formate and tetra-allyloxy ethane.

34. A composition as in claim 33 in which said first peroxide comprises dicumyl peroxide.

35. A composition as in claim 34 in which said second peroxide comprises cumene hydroperoxide.

36. A composition as in claim 1 in which said allyl compound comprises triallyl cyanurate.

37. A composition as in claim 33 in which said first peroxide comprises 2,5-dimethyl-2,5-di(tertiary butyl peroxy)hexane.

38. A composition as in claim 37 in which said second peroxide comprises cumene hydroperoxide.

39. A composition as in claim 38 in which said allyl compound comprises triallyl cyanurate.

40. A composition as in claim 33 in which said first peroxide comprises α,α-bis(tertiary butyl peroxy di-isopropyl)benzene.

41. A composition as in claim 40 in which said second peroxide comprises cumene hydroperoxide.

42. A composition as in claim 41 in which said allyl compound comprises triallyl cyanurate.

43. A composition as in claim 34 in which said second peroxide comprises t-butyl hydroperoxide.

44. A composition as in claim 43 in which said allyl compound comprises triallyl cyanurate.

45. A composition as in claim 43 in which said allyl compound comprises triallyl phosphate.

46. A composition as in claim 40 in which said second peroxide comprises t-butyl hydroperoxide.

47. A composition as in claim 46 in which said allyl compound comprises triallyl cyanurate.

48. The composition of claim 33 in vulcanized form.

49. Electric wire or cable insulated with the composition of claim 33 in vulcanized form.

50. A composition as in claim 1 in which about one part by weight of said second peroxide is used per 2 to 10 parts by weight of said first peroxide.

51. A composition as in claim 50 in which about one part by weight of the allyl compound is used per 1 to 5 parts by weight of said first peroxide.

52. A composition as in claim 51 which further comprises about 0.01 to 3.0 parts by weight of at least one antioxidant for said ethylene polymer.

53. A composition as in claim 52 in which said antioxidant comprises at least one sterically hindered phenol.

54. A composition as in claim 53 in which said sterically hindered phenol is selected from the group consisting of
1,3,5-trimethyl-2,4,6-tris(3,5-ditertiary butyl-4-hydroxy benzyl)benzene,
1,3,5-tris(3,5-ditertiary butyl-4-hydroxy benzyl)-5-triazine-2,4,6-(1H, 3H, 5H)trione,
tetrakis-[methylene-3-(3',5-ditertiary butyl-4'-hydroxy phenyl)-propionate]methane, and
di(2-methyl-4-hydroxy-5-tertiary butyl phenyl) sulfide.

55. A composition as in claim 52 in which said antioxidant comprises polymerized 2,2,4-trimethyl dihydroquinoline.

56. The composition of claim 52 in vulcanized form.

57. Electric wire or cable insulated with the composition of claim 52 in vulcanized form.

58. A process as in claim 26 in which about one part by weight of said second peroxide is used per 2 to 10 parts by weight of said first peroxide.

59. A process as in claim 58 in which about one part by weight of the allyl compound is used per 1 to 5 parts by weight of said first peroxide.

60. A process as in claim 59 in which said composition further comprises about 0.01 to 3.0 parts by weight of at least one antioxidant for said ethylene polymer.

61. A process as in claim 60 in which said antioxidant comprises at least one sterically hindered phenol.

62. A process as in claim 61 in which said sterically hindered phenol is selected from the group consisting of
1,3,5-trimethyl-2,4,6-tris(3,5-ditertiary butyl-4-hydroxy benzyl)benzene,
1,3,5-tris(3,5-ditertiary butyl-4-hydroxy benzyl)-5-triazine-2,4,6-(1H, 3H, 5H)trione,
tetrakis-[methylene-3-(3', 5-ditertiary butyl-4'-hydroxy phenyl)-propionate]methane, and
di(2-methyl-4-hydroxy-5-tertiary butyl phenyl) sulfide.

63. A process as in claim 60 in which said antioxidant comprises polymerized 2,2,4-trimethyl dihydroquinoline.

64. A vulcanized composition made by the process of claim 60.

65. Electric wire or cable insulated with a vulcanized composition prepared by the process of claim 60.

* * * * *